US010165472B2

(12) United States Patent
Basavarajappa et al.

(10) Patent No.: US 10,165,472 B2
(45) Date of Patent: Dec. 25, 2018

(54) SYSTEMS AND METHODS FOR MANAGING CIRCUIT SWITCHED FALLBACK CALLS

(71) Applicant: Intel Corporation, Santa Clara, CA (US)

(72) Inventors: Nitin Gowda Basavarajappa, Breinigsville, PA (US); Deepak Dash, Khordha (IN)

(73) Assignee: Intel IP Corporation, Santa Clara, CA (US)

( * ) Notice: Subject to any disclaimer, the term of this patent is extended or adjusted under 35 U.S.C. 154(b) by 92 days.

(21) Appl. No.: 14/686,506

(22) Filed: Apr. 14, 2015

(65) Prior Publication Data

US 2016/0100336 A1 Apr. 7, 2016

Related U.S. Application Data (60) Provisional application No. 62/059,739, filed on Oct. 3, 2014.

(51) Int. Cl.
| | |
|---|---|
| *H04W 36/00* | (2009.01) |
| *H04W 76/10* | (2018.01) |
| *H04W 76/16* | (2018.01) |
| *H04W 48/18* | (2009.01) |

(52) U.S. Cl.
CPC ....... *H04W 36/0022* (2013.01); *H04W 48/18* (2013.01); *H04W 76/10* (2018.02); *H04W 76/16* (2018.02)

(58) Field of Classification Search
CPC .................................................. H04W 36/0022
See application file for complete search history.

(56) References Cited

U.S. PATENT DOCUMENTS

| | | | |
|---|---|---|---|
| 2013/0063540 A1 | 3/2013 | Zisimopoulos et al. | |
| 2015/0237544 A1* | 8/2015 | Jeong | H04W 36/0022 370/332 |
| 2015/0271724 A1* | 9/2015 | Kotreka | H04W 36/08 370/331 |

(Continued)

FOREIGN PATENT DOCUMENTS

| | | |
|---|---|---|
| WO | 2015126160 A1 | 8/2015 |
| WO | 2015127384 A1 | 8/2015 |

OTHER PUBLICATIONS

3GPP TS 23.272 v12.0.0 Technical Specification, Sep. 2013.*

(Continued)

*Primary Examiner* — Jason E Mattis
(74) *Attorney, Agent, or Firm* — Eschweiler & Potashnik, LLC (57) ABSTRACT

Techniques described herein may enable a wireless cellular network to transfer a call from a packet-switched (PS) portion of the wireless cellular network to a circuit-switched (CS) portion of the wireless cellular network, in a manner that ensures that the CS network receiving the call can actually support the call. For instance, before the wireless cellular network selects RAT for the CS network for transferring a call, the wireless cellular network may identify a call type for the call (e.g., simple voice call, video call, etc.), identify a RAT for the CS network that can support the call type, and proceed to transfer the call to the CS portion of the wireless cellular network that can support the call type, thus ensuring that the call is not dropped as a result of the transfer.

14 Claims, 8 Drawing Sheets

(56) References Cited

U.S. PATENT DOCUMENTS

2016/0227469 A1* 8/2016 Kim .................... H04W 48/06

OTHER PUBLICATIONS

3GPP TS 23.272 v12.4.0, "3rd Generation Partnership Project; Technical Specification Group Services and System Aspects; Circuit Switched (CS) fallback in Evolved Packet System (EPS); Stage 2, (Release 12)", Sep. 22, 2014.

3GPP TS 24.301 v13.0.0, "3rd Generation Partnership Project; Technical Specification Group Core Network and Terminals; Non-Access-Stratum (NAS) protocol for Evolved Packet System (EPS); Stage 3, (Release 12)", Sep. 26, 2014.

3GPP TS 23.401 v13.0.0, "3rd Generation Partnership Project; Technical Specification Group Services and System Aspects; General Packet Radio Service (GPRS) enhancements for Evolved Universal Terrestrial Radio Access Network (E-UTRAN) access, (Release 12)", Sep. 22, 2014.

3GPP TS 36.413 v12.3.0, "3rd Generation Partnership Project; Technical Specification Group Radio Access Network; Evolved Universal Terrestrial Radio Access Network (E-UTRAN); S1 Application Protocol (S1AP), (Release 12)", Sep. 9, 2014.

Intel, "SRVCC based eCSFB Solution with proper CS resource allocation", 3GPP Draft; S2-142725 (revision of S2-142707); SA WG2 Meeting #104; Jul. 11, 2014.

3GPP TS 23.216 v12.1.0, "3rd Generation Partnership Project; Technical Specification Group Services and System Aspects; Single Radio Voice Call Continuity (SRVCC); Stage 2, (Release 12)", Jun. 20, 2014.

Huawei et al., "CSFB optimization based on SRVCC", 3GPP Draft; S2-095143, Aug. 25, 2009.

3GPP Draft 23772-012-RM, "3rd Generation Partnership Project; Technical Specification Group Services and System Aspects; Enhanced Circuit Switched (CS) Fallback; (Release 13)", Sep. 25, 2014.

International Search Report and Written Opinion of corresponding PCT Application PCT/US15/47230 dated Nov. 16, 2015.

* cited by examiner

SYSTEMS AND METHODS FOR MANAGING CIRCUIT SWITCHED FALLBACK CALLS

RELATED APPLICATIONS

The present application claims the benefit of U.S. Provisional Patent Application No. 62/059,739, which was filed on Oct. 3, 2014, and which is hereby incorporated by reference as though fully set forth herein.

BACKGROUND

In a 3rd Generation Partnership Project (3GPP) network, a Long-Term Evolution (LTE) portion of the network supports only data packet (or packet-switched (PS)) services. A Universal Mobile Telecommunications System (UMTS) portion of the network and a Global System for Mobile Communications (GSM) portion of the network may support circuit-switched (CS) services. When a voice call is initiated, the network may cause the call to be transferred from the PS portion of the network to the CS portion of the network. Transferring a call in this manner is often referred to as a CS Fallback Procedure (CSFB).

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may include solutions for ensuring that circuit-switched fallback (CSFB) procedures transfer calls to appropriate circuit-switched (CS) domains. For instance, some types of calls, such as simple voice calls, are supported by both Global System for Mobile Communications (GSM) Radio Access Technology (RAT) and Universal Mobile Telecommunications System (UMTS) RAT. However, other types of calls, such as Unrestricted Digital Information (UDI) video calls are only supported by UMTS RAT. As such, while simple voice calls can safely be transferred to either RAT of the CS domain, UDI video calls that are transferred to the GSM portion of the network are typically dropped, since GSM RAT does not support UDI video calls.

The techniques described herein can ensure that calls, that are transferred using CSFB procedures, are transferred to the proper RAT of the CS domain. For instance, in accordance with some implementations, a User Equipment (UE) may initiate a call via a packet data network (PDN), such as a Long-Term Evolution (LTE) network, while also having access to different CS networks, such as a UMTS network (via UMTS RAT) and a GSM network (via GSM RAT). The UE may indicate to the LTE network a call type (also referred to herein as service type) associated with the call (e.g., a simple voice call, a UDI video call, etc.), and the LTE network may ensure that a CSFB procedure transfers the call to the appropriate CS domain based on the call type. For instance, if the call is a simple voice call, the call may be transferred to either the UMTS network or the GSM network. However, if the call is a UDI video call, the call may only be transferred to the UMTS network, since the call would otherwise be dropped by the GSM network.

In one implementations, a network device comprises circuitry to: receive, from a User Equipment (UE) and via a packet-switched portion of a wireless telecommunications network, a request to establish a call using a circuit-switched portion of a wireless telecommunications network; determine, based on the request, a call type of the call; identify, based on the call type, a type of radio access network, of a plurality of radio access networks capable of supporting different call types, that can support the type of the call requested by the UE, each of the plurality of radio access networks being connected to the circuit-switched portion of the wireless telecommunications network; and communicate, to the packet-switched portion of a wireless telecommunications network, a request to establish the call using the identified radio access network.

In some implementations, the UE is located in a service area corresponding to the Evolved Node B (eNB) and each of the plurality of radio access networks. Additionally, or alternatively, the plurality of radio access networks may include at least one Universal Mobile Telecommunications System (UMTS) Terrestrial Radio Access Network (UTRAN), or a Global System for Mobile Communications (GSM) Enhanced Data Rates for GSM Evolution Radio Access Network (GERAN), and the circuit-switched portion of the wireless telecommunications network may include a Core Network. In some implementations, the call type includes an Unrestricted Digital Information (UDI) video call and the radio access network identified for the call is a UTRAN.

In certain implementations, the request, to establish the call using the circuit-switched portion of the wireless telecommunications network, includes a request for a 3rd Generation Partnership Project (3GPP) Circuit-Switched Fallback (CSFB) procedure with respect to the call. In some implementations, the call type is determined based on a call type code included in the request to establish the call using the circuit-switched portion of the wireless telecommunications network. Additionally, or alternatively, the request to establish the call using the radio access network may include an S1 Application Protocol (S1AP) Request Message when the wireless network is capable of performing the packet-switched handover procedure with respect to the call, and the request to establish the call using the radio access network may include a UE Context Modification Request when the wireless network is incapable of performing a packet-switched handover procedure with respect to the call.

In some implementations, the plurality of radio access networks includes the radio access network capable of supporting the call based on the call type and another radio access network incapable of supporting the call based on the call type. In certain implementations, the network device is a Mobility Management Entity (MME). Additionally, or alternatively, the request to establish the call using the circuit-switched portion of a wireless telecommunications network may be received by an eNB. In certain implementations, the request to establish the call using the identified radio access network is received by an eNB, in communication with the UE, and the eNB participates in a circuit-switched fallback (CSFB) procedure with respect to the UE, in response to receiving the request to establish the call using the identified radio access network.

In another implementation, a User Equipment (UE) comprises a radio access interface capable of establishing a call via a plurality of radio access networks connected to a wireless telecommunications network, the radio access networks being capable of supporting different types of circuit-switched calls; a computer-readable medium to store processor-executable instructions; and processing circuitry to execute the processor executable instructions to: receive, from a user, a request to establish a call, identify, based on the request, a call type for the call, communicate, to a packet-switched portion of the wireless telecommunications network, a request to establish the call via a circuit-switched portion of the wireless telecommunications network, the request to establish the call including the call type, receive, from the packet-switched portion of the wireless telecommunications network, a command to establish the call via a particular radio access network, of the plurality of radio access networks, associated with the circuit-switched portion of the network and capable of supporting the call type of the call, and establish, based on the command, the call via the particular radio access network associated with the circuit-switched portion of the wireless telecommunications network.

In another implementations, a method, implemented by a network device, comprises: receiving, from a User Equipment (UE), a request, via a wireless telecommunications network, to initiate a Circuit-Switched Fallback (CSFB) procedure for a call, the request including call type information representing a circuit-switched (CS) Unrestricted Digital Information (UDI) video call; identifying, in response to the request and based on the call type information, a Universal Mobile Telecommunications System (UMTS) Terrestrial Radio Access Network (UTRAN) available to the UE and connected to the wireless telecommunications network, from among at least one Global System for Mobile Communications (GSM) Enhanced Data Rates for GSM Evolution Radio Access Network (GERAN) available to the UE and connected to the wireless telecommunications network; and communicating, to an Evolved Node B (eNB) connected to the UE, a command to cause the UE to establish the CS UDI video call via the UTRAN.

In yet another implementation, a network device comprises means for receiving, from a User Equipment (UE) and via a packet-switched portion of a wireless telecommunications network, a request to establish a call using a circuit-switched portion of a wireless telecommunications network; means for determining, based on the request, a call type of the call; means for identifying, based on the call type, a type of radio access network, of a plurality of radio access networks capable of supporting different call types, that can support the type of the call requested by the UE, each of the plurality of radio access networks being connected to the circuit-switched portion of the wireless telecommunications network; and means for communicating, to the packet-switched portion of a wireless telecommunications network, a request to establish the call using the identified radio access network.

Figure 1:
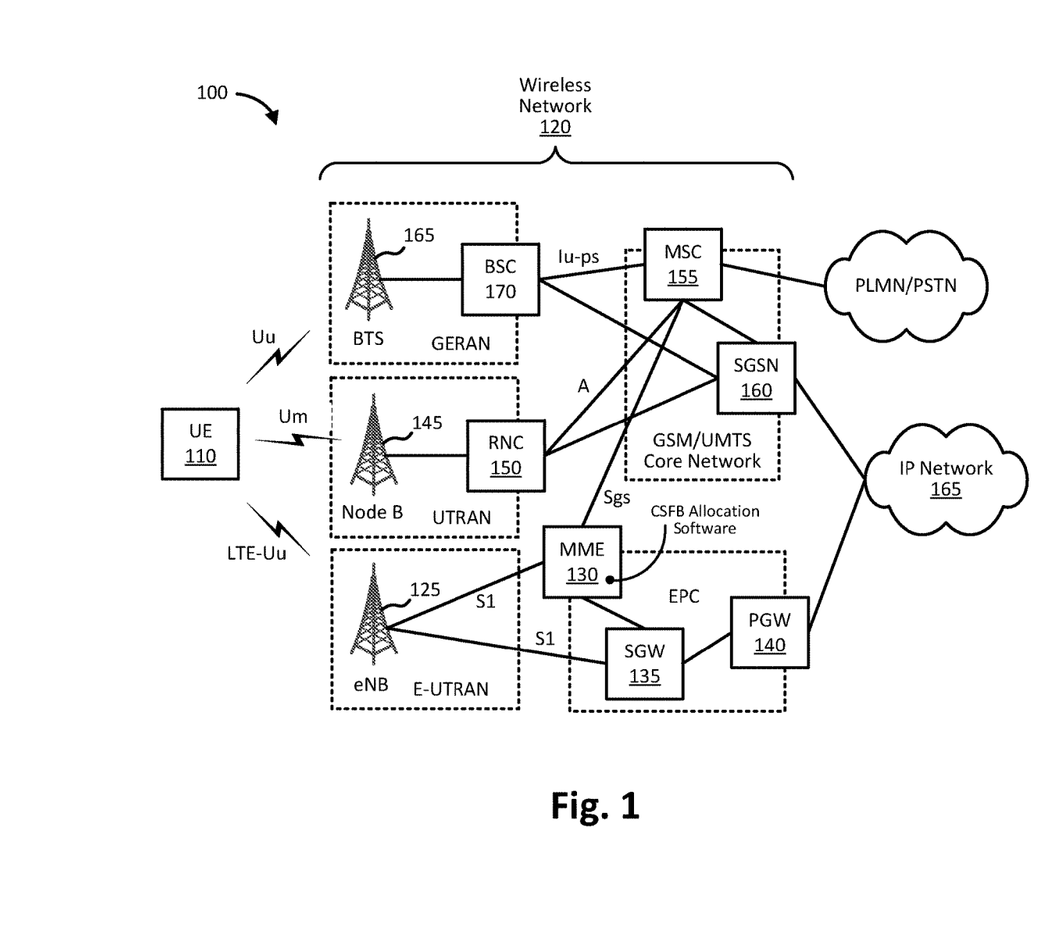
FIG. 1 is a diagram of an example environment in which systems and/or methods described herein may be implemented.

FIG. 1 is a diagram of an example environment 100 in which systems and/or methods described herein may be implemented. As shown, environment 100 may include User Equipment (UE) 110 and wireless network 120.

Wireless network 120 may include an LTE network with an Evolved UMTS Terrestrial Radio Access Network (E-UTRAN) and an Evolved Packet Core (EPC). The E-UTRAN may include Evolved Node B (eNB) 125, and the EPC may include Mobility Management Entity (MME) 130, Serving Gateway (SGW) 135, and PDN Gateway (PGW) 140. Wireless network 120 may also include a UMTS network with a UMTS Terrestrial Radio Access Network (UTRAN) and a UMTS Core Network. The UTRAN may include Node B 145 and Radio Network Controller (RNC) 150. The UMTS Core Network may include Mobile Switching Center (MSC) 155 and Serving General Packet Radio Service Support Node (SGSN) 160. Wireless network 120 may further include a GSM network with a GSM EDGE (Enhanced Data Rates for GSM Evolution) Radio Access Network (GERAN) and a GSM Core Network. The GERAN may include Base Transceiver Station (BTS) 165 and Base Station Controller (BSC) 170, and the GSM Core Network may include an MSC 155 and SGSN 160 (which may be shared with the UMTS Core Network).

UE 110 may include a portable computing and communication devices, such as a personal digital assistant (PDA), a smart phone, a cellular phone, a laptop computer with connectivity to a cellular wireless network, a tablet computer, etc. UE 110 may also include a non-portable computing device, such as a desktop computer, a consumer or business appliance, or another device that has the ability to connect to wireless network 120. UE 110 may connect, through a radio interface, to eNB 125, Node B 145, and/or BTS 165.

eNB 125, Node B 145, and BTS 165 may each include one or more network devices that receive, process, and/or transmit traffic destined for and/or received from UE 110. eNB 125 may include one or more functionalities, such as radio resource management, mobility management, encryption, etc., whereas the functionality of Node B 145 and BTS 165 may be controlled wholly, or in part, by RNC 145 and BSC 170, respectively. eNB 125 may participate in a CSFB procedure regarding a call from UE 110 by ensuring that the call is allocated to a CS domain (e.g., GERAN or UTRAN) based on a call type associated with the call.

MME 130 may include one or more computation and communication devices that act as a control node for eNB 125 and/or other devices that provide the air interface for wireless network 120. For example, MME 130 may perform operations to register UE 110 with wireless network 120, to establish bearer channels (e.g., traffic flows) associated with a session with UE 110, to hand off UE 110 to another network, and to perform policing operations on traffic destined for or received from UE 110.

MME 130 may be in charge of providing services to a call involving UE 110, and may receive an indication of the call type (e.g., a simple voice call, a UDI video call, etc.). MME 130 may identify an appropriate RAT for the CS domain (e.g., GERAN or UTRAN) based on the call type associated with the call and forward information to eNB 125 to ensure that a CSFB procedure for the call is directed to the proper RAT for the CS domain. As shown, MME 130 may include CSFB allocation software that performs one or more of these operations. Additionally, in some implementations, another network device (e.g., a server device) may perform one or more of the foregoing operations described as being performed by MME 130. In such implementations, the network device may include the CSFB allocation software.

SGW 135 may aggregate traffic received from eNB 125 and may send the aggregated traffic to an external network via PGW 140. Similarly, PGW 140 may include one or more network devices that may aggregate traffic received from SGW 135 and may send the aggregated traffic to an Internet Protocol (IP) network 165. PGW 140 may receive traffic from the IP network 165 and may send the traffic toward UE 110 via SGW 135 and/or eNB 125.

RNC 150 may include one or more computation and communication devices that act as a control node for Node B 145. RNC 150 may carry out radio resource management, certain mobility management functions, and may be the point where encryption is conducted before user data is sent to and from UE 110. BSC 170 may also include one or more computation and communication devices may function to control the configuration and operation of BTS 165. For instance, BSC 170 may be in charge of allocating radio channels and managing UE handover procedures.

MSC 155 may include one or more computation and communication devices that carry out call switching between wireless network 120 and external networks, such as a Public Land Mobile Networks (PLMN) and/or a Public Switched Telephone Network (PSTN). MSC 155 may also be in charge of mobility management functions as UEs migrate amongst BTSs 165. SGSN 160 may include one or more computation and communication devices responsible for the delivery of data packets to and from UE 110. For instance, the SGSN 160 may route and transfer information (e.g., packets) within wireless network 120, be in charge of attachment, detachment, and location management issues, and may perform authentication and charging functions. As shown, SGSN 160 may provide a link between wireless network 120 and an IP network 165, such as the Internet.

A number of communication interfaces, which may include standardized LTE, UMTS, and GSM interfaces, are illustrated in FIG. 1. For example, a Uu interface may be used for communications between UE 110 and eNB 125, while an S1 interface may be used for communications between eNB 125 and MME 130 and/or SGW 135. A Um interface may be used for communications between UE 110 and Node B 145, and a Uu interface may be used for communications between UE 110 and BTS 165. Additionally, MSC 155 may communicate with BSC 170 via an Iu-ps interface, with RNC 150 via an A interface, and with MME 130 via a Sgs interface. The interfaces illustrated in FIG. 1 are intended for examples only. As such, one or more additional, and/or alternative, interfaces may also be implemented. Additionally, one or more protocols may be used in communicating between the devices of wireless network 120. Examples of such protocols may include General Packet Radio Service (GPRS) Tunnel Protocol (GTP), Application Protocol for the S1 interface (S1AP), etc.

The quantity of devices and/or networks in environment 100 is not limited to what is shown in FIG. 1. In practice, environment 100 may include additional devices and/or networks, fewer devices and/or networks, different devices and/or networks, or differently arranged devices and/or networks than illustrated in FIG. 1. Also, in some implementations, one or more of the devices of environment 100 may perform one or more functions described as being performed by another one or more of the devices of environment 100.

Figure 2:
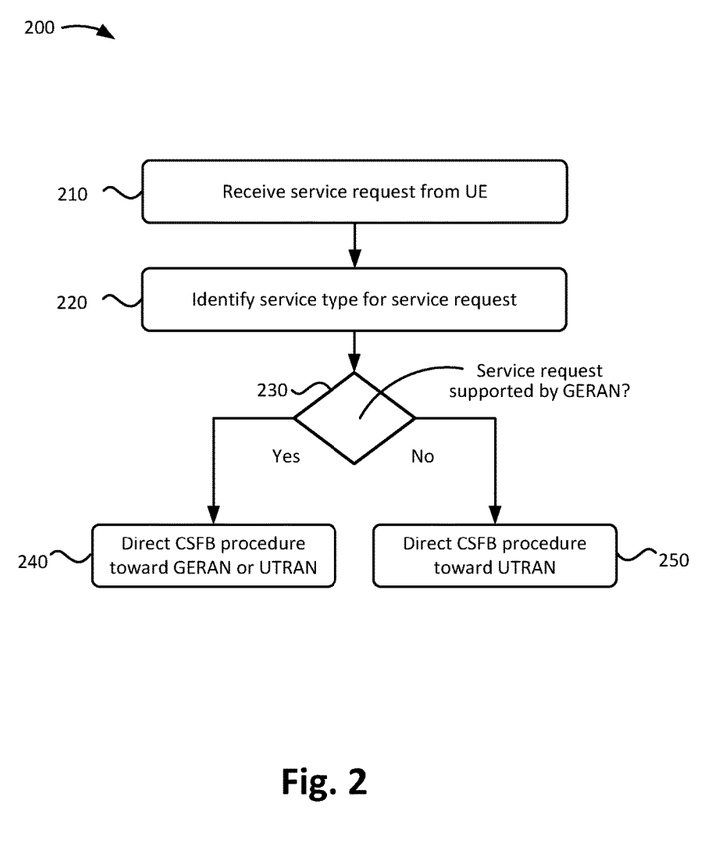
FIG. 2 is a flow chart illustrating an example process for directing a circuit-switched fallback (CSFB) procedure according to call type, from the perspective of a Mobility Management Entity (MME).

FIG. 2 is a flow chart illustrating an example process 200 for directing a CSFB procedure according to call type. Process 200 may be implemented, for example, by one or more network devices, such as MME 130 or a combination of devices such as MME 130 and eNB 125. In some implementations, another network device (e.g., a server device) may perform one or more of the operations described as being performed by MME 130. In such implementations, the network device may communicate with MME 130 in order to send and/or receive one or more types of information to accomplish the techniques described herein.

Process 200 may include receiving a service request from UE 110 (block 210). For example, MME 130 may receive a service request from UE 110. As discussed below with reference to FIG. 3, the service request may include an indication of a service type of a call being made by UE 110. In some implementations, MME 130 may receive the service request via eNB 125. For instance, the service request may first be received by eNB 125, and eNB 125 may forward the service request to MME 130. The service request may include a request (e.g., an Extended Service Request) to initiate a CSFB procedure with respect to a call between two UEs 110 (e.g., as discussed in 3GPP TS 23.272, v 12.4.0). Additionally, the service request may include information (e.g., a service type code or identifier) representing the type of call to which the service request corresponds (e.g., a simple voice call, a UDI video call, etc.).

Process 200 may include identifying a service type for the service request (block 220). For example, MME 130 may identify a type of call, to which the service request corresponds, based on the service type code included in the service request. The service type information may take the form of an unused service type value (e.g., as discussed in 3GPP TS 24.301, v13.0.0). For instance, the service type information may be a sequence of bits, such as "0011" in a service type value octet.

Process 200 may include determining whether the service request is supported by GERAN (block 230). For example, MME 130 may determine whether the service request is supported by a RAT of the CS domain, such as GERAN, based on the service type associated with the service request. MME 130 may maintain a list of Radio Access Networks (RANs) that support different services types, and MME 130 may match the service type in the service request with a RAN that can support the service type.

If the service type is supported by GERAN (230—Yes), MME 130 may proceed by directing a CSFB procedure for the call toward either one of GERAN or UTRAN (block 240). However, if the service type is not supported by GERAN (230—No), MME 130 may proceed by directing a CSFB procedure for the call toward UTRAN (block 250). The CSFB procedure may be consistent with a 3GPP CSFB procedures, as provided in, for example, 3GPP TS 23.272, and may include a variety of network operation involved in redirecting a call to a PLMN/PSTN via MSC 155 and either BSC 170 and BTS 165, or RNC 150 and Node B 145.

While FIG. 2 shows a flowchart diagram of an example process 200 for directing a CSFB procedure according to a call type, in other implementations, a process for directing a CSFB procedure according to call type may include fewer operations, different operations, differently arranged operations, and/or additional operations than depicted in FIG. 2. Additionally, while the blocks of process 200 are described with reference to MME 130, some or all of the blocks of process 200 may be performed by one or more other devices. For instance, in some implementations, MME 130 may forward the service type to eNB 125, and eNB 125 (instead of MME 130) may identify an appropriate access network for a call based on a call service type.

Figure 3:
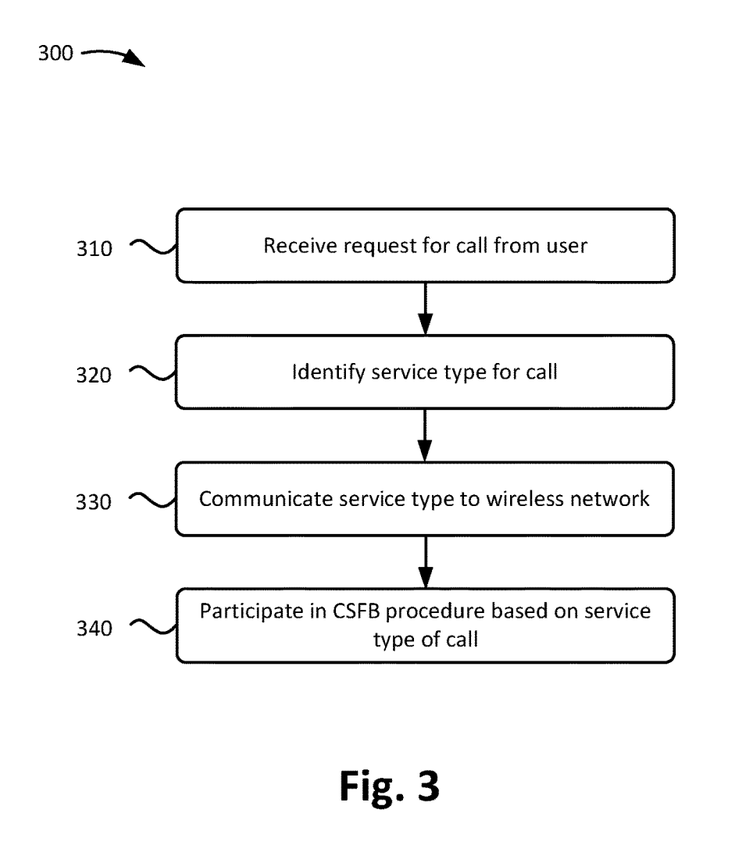
FIG. 3 is a flow chart illustrating an example process for initiating a CSFB procedure that is based on a call type, from the perspective of a User Equipment (UE).

FIG. 3 is a flow chart illustrating an example process 300 for initiating a CSFB procedure that is based on a call type. Process 200 may be implemented, for example, by UE 110.

As shown, process 300 may include receiving a request for a call from a user (block 310). For example, UE 110 may enable a user to input information into UE 110 amounting to a user requesting to make a call (e.g., a voice call, a UDI video call, etc.) via UE 110 and wireless network 120. The request may include the user selecting one or more buttons presented as part of a user interface, the user providing one or more audible commands, a command from the user via a peripheral device attached to UE 110 (e.g., a microphone and speaker system in an automobile), etc.

Process 320 may include identifying a service type (or call type) for a call (block 320). For example, UE 110 may determine the type of call that has been requested by a user. As mentioned above, a call may include a simple voice call, a UDI video call, or another type of call. In some implementations, UE 110 may designate the type of call by determining a service type code associated with the call. The service type code may include a sequence of bits that has been pre-selected for representing the call type. As mentioned above, the service type information may take the form of an unused service type value as discussed in 3GPP 24.301, Section 9.9.3.27. For instance, the service type information may be a sequence of bits, such as "0011" in a service type value octet.

Process 300 may include communicating the service type to wireless network 120 (block 330). For instance, UE 110 may communicate a service type to eNB 125 using an Extended Service Request message. As mentioned above, in a 3GPP network, an Extended Service Request message may include a request to initiate a CSFB procedure for a call. As such, before communicating the Extended Service Request message, UE 110 may first verify that UE 110 has access to a RAT of the CS domains (e.g., GERAN and UTRAN) to which the call could be transferred.

Process 300 may include participating in a CSFB procedure that is based on the service type of the call (block 340). For example, UE 110 may perform one or more operations in order collaborate with wireless network 120 in executing a CSFB procedure. Examples of such operations may include receiving instructions from eNB 125 for establishing a CS call path via a GERAN (e.g., BTS 165, BSC 170, and MSC 155) or a UTRAN (e.g., Node B 145, RNC 150, and MSC 155). In such implementations, registration for the CS call path and paging procedures may be achieved via E-UTRAN (e.g., eNB 125, MME 130, and MSC 155). As mentioned above, the CSFB procedure may be consistent with the CSFB procedure described in, for example, 3GPP TS 23.272.

Figure 4:
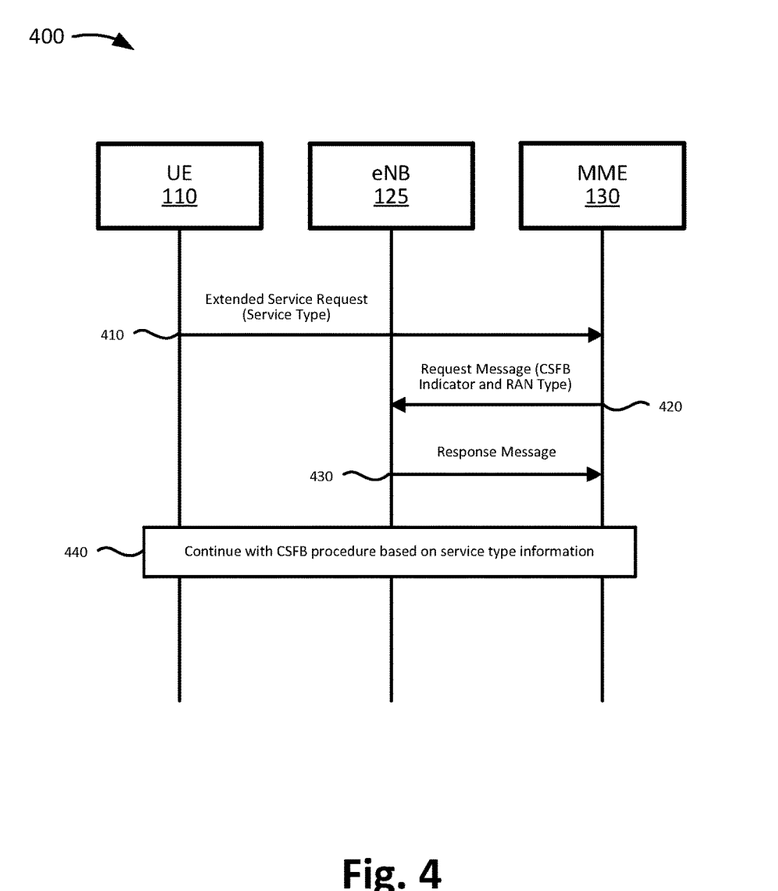
FIG. 4 is a signal flow diagram illustrating a process for directing a CSFB procedure based on a call type.

FIG. 4 is a signal flow diagram illustrating a process 400 for directing a CSFB procedure based on a call type. As shown, UE 110 may communicate a service request message (e.g., an Extended Service Request message) to MME 130 (line 410). The service request message include a request to establish a telephone call with another UE 110 via a CSFB procedure (e.g., a procedure that will establish the call through a CS portion of wireless network 120 instead of a PS portion of wireless network 120). Additionally, the service request message may include information describing a service type that represents the type of call being requested. The service type may correspond to calls that can be supported by both GERAN and UTRAN, such as a simple voice call. Alternatively, the service type may correspond to calls that can only be supported by UTRAN, such as UDI video calls.

The service request message may be encapsulated in Radio Resource Control (RRC) and S1AP messages and may cause MME 130 to perform a CSFB procedure. As mentioned above, UE 110 may only transmit the service request message if UE 110 is also attached to a CS domain (e.g., a GERAN or a UTRAN) and/or UE 110 is unable to initiate a packet-switched voice call (e.g., an IP Multimedia Subsystem (IMS) voice session) which may be due to UE 110 not being IMS registered or IMS voice services not being supported by the serving IP Connectivity Access Network (IP-CAN), home Public Land Mobile Network (PLMN), etc.

In response to receiving the service request message, MME 130 may a request message to eNB 125 (line 420) to request that eNB 125 assist in performing the CSFB procedure. In some implementations, the request message may include one or more types of message, examples of which are discussed below with reference to FIG. 5 and FIG. 6, and which may depend on the ability of wireless network 120 to perform a PS Handover (PS HO) procedure. The request message may include the CSFB Indicator received from UE 110 and/or an indication of a type of RAN (e.g., GERAN or UTRAN) that is appropriate for the CSFB procedure. This type of RAT indication may be a new addition that is not present in the existing 3GPP standard. As discussed below with reference to FIGS. 5-7, the RAT indication may be included as part of the content of an S1AP message. Additionally, or alternatively, the RAT indication may be indicated as a service type code as discussed below with reference to FIG. 7.

eNB 125 may respond to MME 130 by sending a response message (line 430) that may confirm the assistance and compliance of eNB 125 with respect to the CSFB procedure being requested. In some implementations, the response message may include one or more types of message, examples of which are discussed below with reference to FIG. 5 and FIG. 6. The type and content of the response message from eNB 125 may depend on the type of request message received from MME 130.

As shown in FIG. 4, once MME 130 and eNB 125 are aware of the type of call (e.g., a simple voice call, a UDI video call, etc.) the CSFB procedure may continue (block 440) in a manner that ensures that the call will be established using the proper CS domain, which may involve more network devices than those shown in FIG. 4. For example, the CSFB procedure may include UE 110 receiving a command from eNB 125 to establish a CS call path via a GERAN (e.g., BTS 165, BSC 170, and MSC 155) or a UTRAN (e.g., Node B 145, RNC 150, and MSC 155). In such implementations, registration for the CS call path and paging procedures may be achieved via E-UTRAN (e.g., eNB 125, MME 130, and MSC 155).

As mentioned above, the CSFB procedure may be performed in accordance with 3GPP TS 23.272, and may include one or more procedures, such as a Measurement Report Solicitation procedure to determine a target GERAN or UTRAN cell, a Packet-Switched Handover (PS HO) procedure toward the GERAN or the URAN (see, e.g., 3GPP TS 23.401), a Location Area Update (LA Update, or LAU) procedure to direct UE 110 to the selected GERAN or UTRAN, a Connection Management (CM) service request from UE 110 to MSC 155, a CS call establishment procedure to establish the CS call with the CS domain that can support the call type, and more. In some implementations, such as implementations without a PS HO, the CSFB procedure may include additional, or alternative operations, such as an inter-RAT cell change procedure, an S1 UE Context Release procedure, a CS Mobile Originated (MO) call, and/or a Routing Area (RA) Update procedure or a Combined RA/LA Update procedure (See, e.g., 3GPP TS 23.401).

In some implementations, another network device (e.g., a server device) may perform one or more of the operations described above as being performed by MME 130. In such implementations, the network device may communicate with MME 130 in order to send and/or receive one or more types of information to accomplish the techniques described herein.

Figure 5:
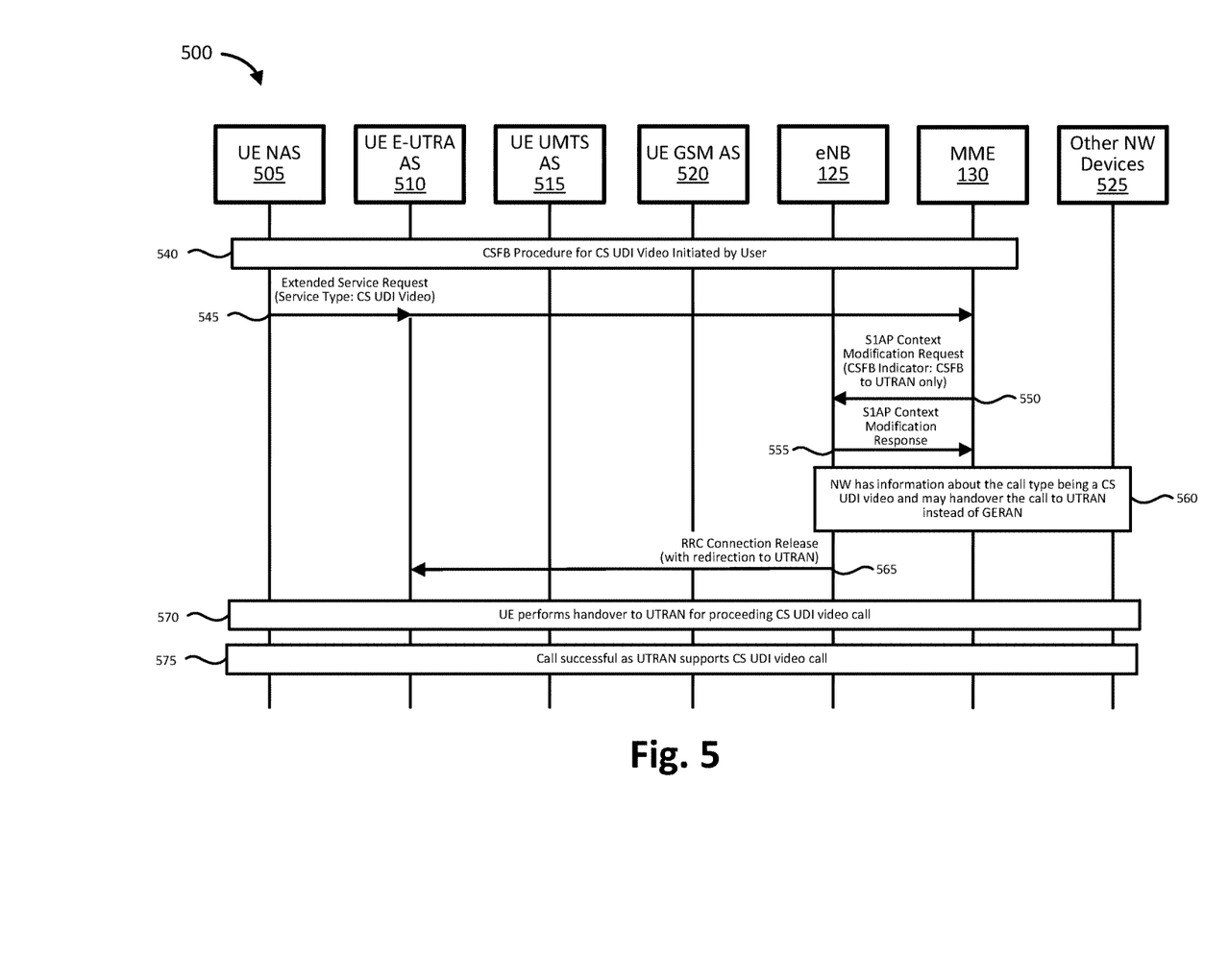
FIG. 5 is a signal flow diagram illustrating a process for performing a CSFB procedure based on a call type.

FIG. 5 is a signal flow diagram illustrating a process 500 for performing a CSFB procedure based on a call type. As shown, process 500 may include UE Non-Access Stratum (NAS) 505, UE E-UTRAN Access Stratum (AS) 510, UE UMTS AS 515, UE GSM AS 520, eNB 125, MME 130, and other network (NW) devices 525. The signal flow diagram of FIG. 5 may be implemented in scenarios where a packet-switched handover (PS HO) is not supported by wireless network 120, such that a connection between UE 110 and wireless network 120 is released and re-established during the CSFB procedure (see, e.g., 3GPP TS 23.272, Sec. 6.3).

A NAS (e.g., a UE NAS 505) may include a functional layer in wireless network protocol stacks between UE 110 and a core network (e.g., an EPC, a UMTS Core Network, and a GSM Core Network). While the NAS for LTE, UMTS, and GSM networks may vary, the NAS may generally be responsible for activities such as establishing communications sessions and maintaining continuous communications between UE 110 and a core network as the UE moves from one geographic location to another. An AS (e.g., UE E-UTRA AS 510, UE UMTS AS 515, etc.) may include a functional layer involving wireless network protocol stacks between UE 110 and an access network (e.g., E-UTRAN, UTRAN, and GERAN). While the AS for LTE, UMTS, and GSM networks vary, the AS may generally be responsible for activities such as transporting data over a wireless connection and managing radio resources. Additionally, while several of the elements in FIG. 5 may represent NAS or AS aspects of wireless network 120, eNB 125 and MME 130 may represent actual physical devices that are discussed throughout this specification. Similarly, other NW elements 525 may represent one or more network devices other than eNB 125 and MME 130, such as Node B 145, RNC 150, MSC 155, etc.

As shown in FIG. 5, a CSFB procedure for a CS UDI video call may be initiated by a user of UE 110 (block 540). The CSFB procedure may be carried out by operations involving a collaboration of the depicted elements (e.g., UE NAS 505, UE E-UTRA AS 510, UE UMTS AS 515, UE GSM AS 520, eNB 125, and MME 130). As mentioned above, the CSFB procedure may be initiated and carried out in accordance with 3GPP TS 23.272. As part of the CSFB procedure, UE NAS 505 may be used to communicate an extended service request to MME 130 via UE E-UTRA AS 510 (line 545). The extended service request may include service type information that describes the call as a CS UDI video call (see, e.g., FIG. 7).

Upon receiving the extended service request, MME 130 may send a context modification message (e.g., a S1AP Context Modification Request message) to eNB 125 (block 550). The context modification message may include information informing eNB 125 that a CSFB procedure should be executed toward a UTRAN instead of a GERAN. eNB 125 may respond with a modification response message, such as an S1AP Context Modification Response message (line 565) to, for example, confirm the assistance and compliance of eNB 125 with respect to the CSFB procedure being requested. In this manner, the network may become aware that: 1) the initiated call is a CS UDI video call; and 2) a CSFB for the call should be directed toward the UTRAN only (not the GERAN). In some implementations, another network device (e.g., a server device) may perform one or more of the operations described above as being performed by MME 130. In such implementations, the network device may communicate with MME 130 in order to send and/or receive one or more types of information to accomplish the techniques described herein.

As such, eNB 125 may send a connection release command (e.g., an RRC Connection Release message) directed toward UE E-UTRA AS 510 (line 565). The connection release command may include information for directing the CS UDI video call toward the UTRAN (e.g., UE UMTS AS 515 instead of UE GSM AS 520). Once the CS UDI video call is established via the UTRAN in accordance with the connection release command, UE 110 may remain with the UTRAN for the duration of the CS UDI video call (blocks 570). As a result, the CS UDI video call may be successful since the UTRAN (as opposed to the GERAN) supports the CS UDI video call (line 575).

Figure 6:
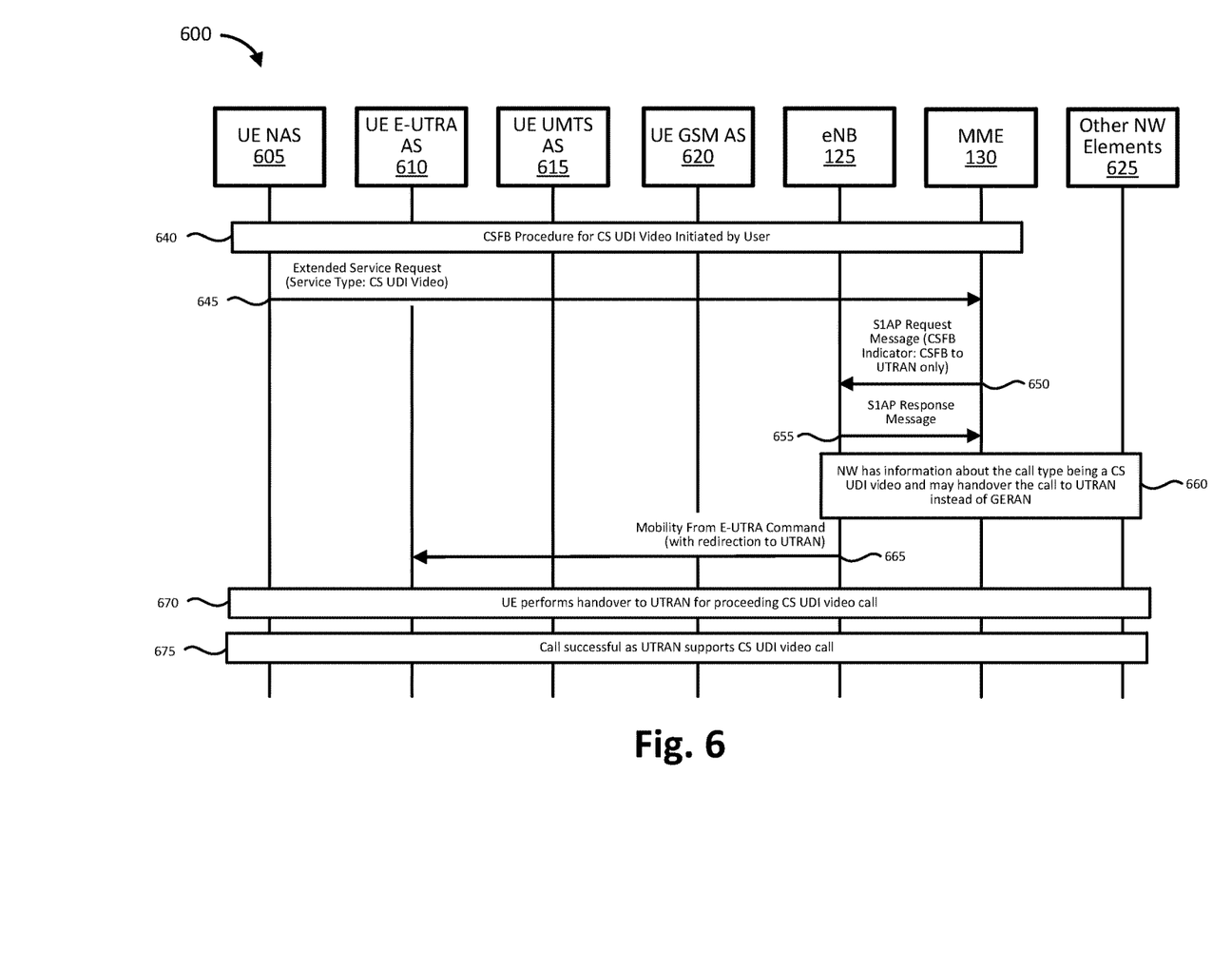
FIG. 6 is a signal flow diagram illustrating another process for performing a CSFB procedure based on a call type.

FIG. 6 is a signal flow diagram illustrating a process 600 for performing a CSFB procedure based on a call type. As shown, process 600 may include UE NAS 605, UE E-UTRAN AS 610, UE UMTS AS 615, UE GSM AS 620, eNB 125, MME 130, and other NW devices 625. The signal flow diagram of FIG. 6 may be implemented in scenarios where a PS HO is supported by wireless network 120 (See, e.g., 3GPP TS 23.272, Sec. 6.2) as a way to transfer a call to a UTRAN.

As described above, a NAS (e.g., a UE NAS 605) may include a functional layer in wireless network protocol stacks between UE 110 and a core network (e.g., an EPC, a UMTS Core Network, and a GSM Core Network). While the NAS for LTE, UMTS, and GSM networks may vary, the NAS may generally be responsible for activities such as establishing communications sessions and maintaining continuous communications between UE 110 and the core network as the UE moves from one geographic location to another. An AS (e.g., UE E-UTRA AS 610, UE UMTS AS 615, etc.) may include a functional layer involving wireless network protocol stacks between UE 110 and an access network (e.g., E-UTRAN, UTRAN, and GERAN). While the AS for E-LTE, UMTS, and GSM networks vary, the AS may generally be responsible for activities such as transporting data over a wireless connection and managing radio resources. Additionally, while several of the elements in FIG. 6 may represent NAS or AS aspects of wireless network 120, eNB 125, and MME 130 may represent actual physical devices that are discussed throughout this specification. Similarly, other NW elements 625 may represent one or more network devices other than eNB 125 and MME 130, such as Node B 145, RNC 150, MSC 155, etc.

As shown in FIG. 6, a CSFB procedure for a CS UDI video call may be initiated by a user of UE 110 (block 640). The CSFB procedure may be carried out by operations involving a collaboration of the depicted elements (e.g., UE NAS 605, UE E-UTRA AS 610, UE UMTS AS 615, UE GSM AS 620, eNB 125, and MME 130). As mentioned above, the CSFB procedure may be initiated and carried out in accordance with 3GPP TS 23.272. As part of the CSFB procedure, UE NAS 605 may be used to communicate an extended service request to MME 130 via UE E-UTRA AS 610 (line 545). The extended service request may include service type information that describes the call as a CS UDI video call (see, e.g., line 645).

Upon receiving the extended service request, MME 130 may send a request message (e.g., a S1AP Request Message) to eNB 125 (block 650). The request message may include information informing eNB 125 that a CSFB procedure should be executed toward a UTRAN instead of a GERAN. eNB 125 may respond with a message (e.g., an S1AP Response Message) acknowledging the request from MME 130 (line 665) to, for example, confirm the assistance and compliance of eNB 125 with respect to the CSFB procedure being requested. In this manner, the network may become aware that: 1) the initiated call is a CS UDI video call; and 2) a CSFB for the call should be directed toward the UTRAN only (not the GERAN). In some implementations, another network device (e.g., a server device) may perform one or more of the operations described above as being performed by MME 130. In such implementations, the network device may communicate with MME 130 in order to send and/or receive one or more types of information to accomplish the techniques described herein.

eNB 125 may send a command message (e.g., a Mobility From E-UTRA Command message) directed to UE E-UTRA AS 610 to initiate a handover procedure (e.g., a PS HO procedure) involving UE 110 (line 665). The command message may include information for directing the CS UDI video call toward the UTRAN (e.g., UE UMTS AS 615 instead of UE GSM AS 620). Once the CS UDI video call is established via the UTRAN in accordance with the command message, UE 110 may remain with the UTRAN for the duration of the CS UDI video call (blocks 670). As a result, the CS UDI video call will be successful since the UTRAN (as opposed to the GERAN) supports the CS UDI video call (line 675).

Figure 7:
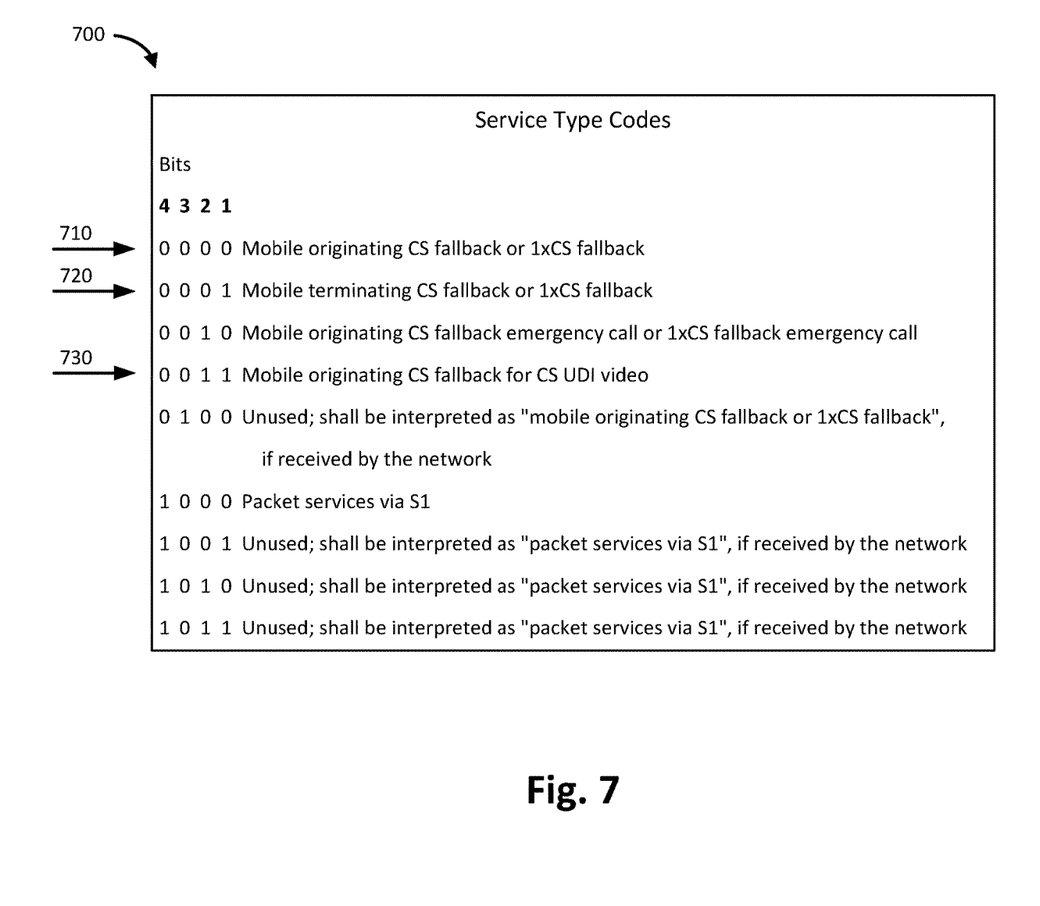
FIG. 7 is a table diagram of example service type codes.

FIG. 7 is a table diagram of example service type codes 700. In accordance with 3GPP TS 24.301, Sec. 9.9.3.27 and as shown in FIG. 7, service type codes may include a four bit code that represents a condition or circumstance within wireless network 120. For instance, the bit code of "0000" (arrow 710) may indicate a mobile (e.g., UE 110) originating a CSFB call, while "0001" (arrow 720) may indicate a mobile terminating a CSFB call. The service type codes may be incorporated into service type information elements, which may be communicated throughout wireless network 120 in order to perform various CSFB procedures and operations.

For instance, as described above, an Extended Service Request message from UE 110 to MME 130 may include service type information that indicates that a particular call is a CS UDI video call (as opposed to a simple voice call for example). In reference to the table of FIG. 7, this may be accomplished by using, for example, the service type code "0011" (arrow 730) within a service type information element of the Extended Service Request message, which may provide a mechanism for ensuring that wireless network 120 establishes a corresponding CSFB call via an access network that can support the call type (e.g., a UTRAN). As such, the techniques for establishing CSFB calls according to call type, as described herein, may be seamlessly and elegantly adapted to existing 3GPP technologies via service type codes and procedures that involve service type codes.

Figure 8:
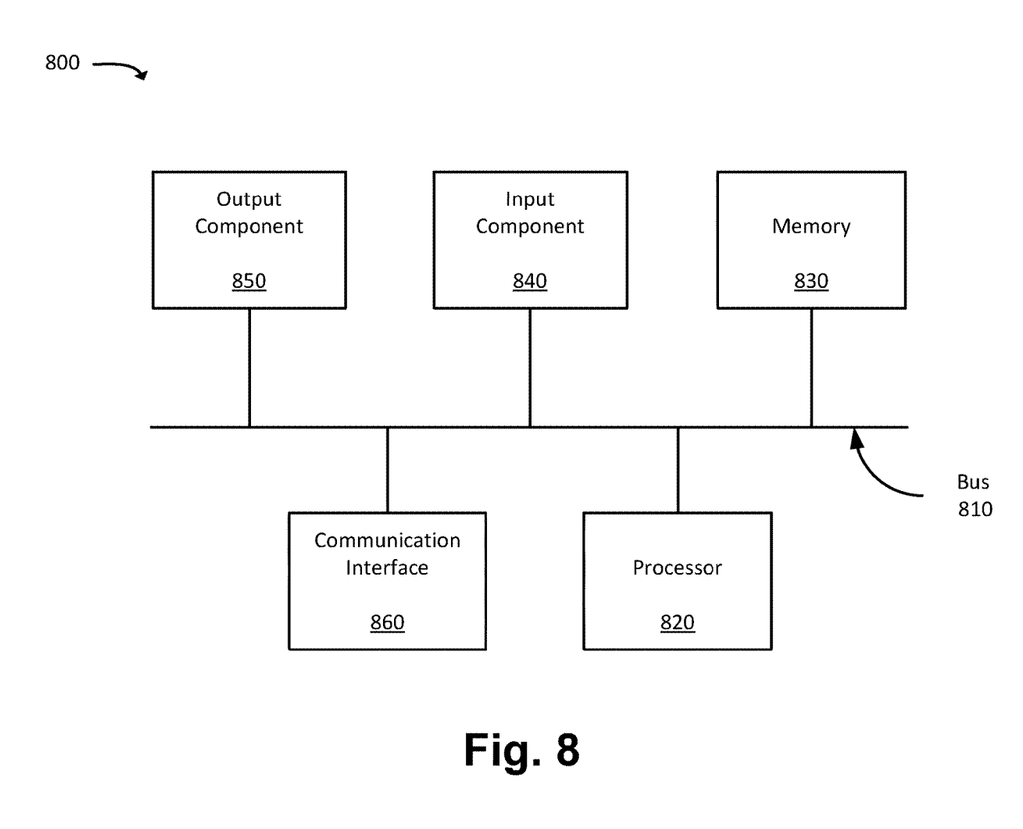
FIG. 8 is a diagram of example components of a device.

FIG. 8 is a diagram of example components of a device 800. Each of the devices illustrated in FIGS. 1, 4, 5, and/or 6 and may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 3, the order of the blocks may be modified in other implementations. Further, non-dependent blocks may be performed in parallel. Similarly, while a series of communications have been described with regard to FIGS. 4-6, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as application-specific integrated circuit (ASIC) or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device comprising:
   a computer-readable medium to store processor-executable instructions; and
   processing circuitry to execute the processor executable instructions to:
   receive, from a User Equipment (UE) and via a packet-switched portion of a wireless telecommunications network, a request to establish a call using a circuit-switched portion of a wireless telecommunications network, the request including a four-bit service type parameter, out of a plurality of candidate four-bit service type parameters, wherein the plurality of candidate four-bit service type parameters includes a particular four-bit service type parameter that indicates that a call type of the call is an Unrestricted Digital Information (UDI) video call;
   determine, based on the four-bit service type parameter of a service type value octet of the request, whether a call type of the call is a UDI video call;
   select, based on the four-bit service type parameter, a particular radio access network, of a plurality of radio access networks capable of supporting different call types, that can support the call requested by the UE, each of the plurality of radio access networks being connected to the circuit-switched portion of the wireless telecommunications network, the selecting including:
   selecting, when the four-bit service type parameter is the particular four-bit service parameter that indicates that the call type of the call is a UDI video call, a Universal Mobile Telecommunications System (UMTS) Terrestrial Radio Access Network (UTRAN) of the wireless telecommunication network, and
   selecting, when the four-bit service type parameter is different from the particular four-bit service parameter that indicates that the call type of the call is a UDI video call, a Global System for Mobile Communications (GSM) Enhanced Data Rates for GSM Evolution Radio Access Network (GERAN) of the wireless telecommunication network; and
   communicate, to the packet-switched portion of the wireless telecommunications network, a request to establish the call using the selected radio access network.

2. The network device of claim 1, wherein the UE is located in a service area corresponding to an Evolved Node B (eNB) and each of the plurality of radio access networks.

3. The network device of claim 1,
   wherein the circuit-switched portion of the wireless telecommunications network includes a Core Network.

4. The network device of claim 1, wherein the particular four-bit service parameter, associated with UDI video calls, is 0011.

5. The network device of claim 1, wherein the request, to establish the call using the circuit-switched portion of the wireless telecommunications network, includes a request for a 3rd Generation Partnership Project (3GPP) Circuit-Switched Fallback (CSFB) procedure with respect to the call.

6. The network device of claim 1, wherein the call type is determined based on a call type code included in the request to establish the call using the circuit-switched portion of the wireless telecommunications network.

7. The network device of claim 1,
   wherein the request to establish the call using the radio access network includes an S1 Application Protocol (S1AP) Request Message when the wireless network is capable of performing the packet-switched handover procedure with respect to the call, and
   wherein the request to establish the call using the radio access network includes a UE Context Modification Request when the wireless network is incapable of performing a packet-switched handover procedure with respect to the call.

8. The network device of claim 1, wherein the plurality of radio access networks includes,
   the radio access network capable of supporting the call based on the call type, and
   another radio access network incapable of supporting the call based on the call type.

9. The network device of claim 1, wherein the network device is a Mobility Management Entity (MME).

10. The network device of claim 1, wherein the request to establish the call using the circuit-switched portion of a wireless telecommunications network is received by an eNB.

11. The network device of claim 1, wherein the request to establish the call using the identified radio access network is received by an eNB, in communication with the UE, and
wherein the eNB participates in a circuit-switched fallback (CSFB) procedure with respect to the UE, in response to receiving the request to establish the call using the identified radio access network.

12. A non-transitory, computer-readable medium containing program instructions for causing one or more processors, associated with a network device, to:
receive, from a User Equipment (UE) and via a packet-switched portion of a wireless telecommunications network, a request to establish a call using a circuit-switched portion of a wireless telecommunications network;
determine, based on a four-bit service type parameter of a service type value octet of the request, whether a call type of the call is an Unrestricted Digital Information (UDI) video call,
wherein the four-bit service type parameter is a particular four-bit service type parameter out of a plurality of candidate four-bit service parameters that include,
the plurality of candidate four-bit service parameters including one particular four-bit service parameter associated with UDI video calls;
select, based on the four-bit service parameter, a particular radio access network, of a plurality of radio access networks capable of supporting different call types, that can support the call requested by the UE, each of the plurality of radio access networks being connected to the circuit-switched portion of the wireless telecommunications network, the selecting including:
selecting, when the four-bit service type parameter is the particular four-bit service parameter that indicates that the call type of the call is a UDI video call, a Universal Mobile Telecommunications System (UMTS) Terrestrial Radio Access Network (UTRAN) of the wireless telecommunication network, and
selecting, when the four-bit service type parameter is different from the particular four-bit service parameter that indicates that the call type of the call is a UDI video call, a Global System for Mobile Communications (GSM) Enhanced Data Rates for GSM Evolution Radio Access Network (GERAN) of the wireless telecommunication network; and
communicate, to the packet-switched portion of a wireless telecommunications network, a request to establish the call using the selected radio access network.

13. The non-transitory, computer-readable medium of claim 12, wherein the request, to establish the call using the circuit-switched portion of the wireless telecommunications network, includes a request for a 3rd Generation Partnership Project (3GPP) Circuit-Switched Fallback (CSFB) procedure with respect to the call.

14. The non-transitory, computer-readable medium of claim 12, wherein the call type is determined based on a call type code included in the request to establish the call using the circuit-switched portion of the wireless telecommunications network.

* * * * *